United States Patent

[11] 3,622,352

| [72] | Inventor | Frank L. Daylor, Jr. |
| | | Richmond, Va. |
| [21] | Appl. No. | 33,483 |
| [22] | Filed | Apr. 30, 1970 |
| [45] | Patented | Nov. 23, 1971 |
| [73] | Assignee | Philip Morris, Incorporated |
| | | Richmond, Va. |

[54] EDIBLE COMPOSITIONS AND METHOD FOR COATING THEM
10 Claims, No Drawings

[52] U.S. Cl.................................................. 99/166,
99/126, 99/134 R, 99/135, 99/140 R, 99/142,
424/30, 424/35, 424/173
[51] Int. Cl..................................................... A23g 3/30,
A23l 1/26
[50] Field of Search............................................ 99/140,
142, 166, 135, 126, 134, 78; 424/35

[56] References Cited
UNITED STATES PATENTS

| 2,262,087 | 11/1941 | Bartlett | 99/135 X |
| 2,631,938 | 3/1953 | Miers | 99/166 |
| 2,899,467 | 8/1959 | Brennan | 99/134 X |
| 3,062,660 | 11/1962 | Alikonis | 99/126 |
| 3,361,631 | 1/1968 | Weinstein | 99/166 X |
| 3,456,050 | 7/1969 | Rieckmann | 99/166 X |
| 3,485,642 | 12/1969 | Koch | 99/166 X |

Primary Examiner—Joseph Scovronek
Attorney—Watson, Leavenworth & Kelton

ABSTRACT: The use of an alcohol solution of a desired flavoring acid such as citric acid to be applied to a sugar-coated core such as chewing gum, nuts, dragees, or confections. The alcohol is evaporated off, leaving the acid flavoring agent as a coating. Thereafter, an additional layer of sugar, shellac, or other similar substance may be applied to the acid-covered core.

EDIBLE COMPOSITIONS AND METHOD FOR COATING THEM

BACKGROUND OF THE INVENTION

It is the practice in applying candy coating to confections such as nuts, chewing gum, and the like, or in providing a sugar coating to medicinal cores, to apply a water solution of the sugar, together with flavorant, coloring, or other additives to the substance to be coated. In various instances, the articles or confections being coated are either covered with the sugar syrup as they travel over a tray or conveyor with means for causing evaporation, or are tumbled in a large vessel or "pan" with syrup, with a stream of warm air being played on the vessel contents to dry the coating. In the latter case, more syrup is introduced with further tumbling and in this way a coating is built up layer by layer to the desired thickness.

Various flavorants used in such preparations are made more effectively by the addition of an acidulant to supplement the flavor, or an acidulant is often desirable as the sole flavorant. In either case, however, an acidulant in solution with the sugar is prohibited because in the presence of water the acid catalyzes the inversion of the sucrose. The invert sugar, being more hygroscopic and less easily crystallized than sucrose, makes the coating, particularly in a humid atmosphere, undesirably sticky. On the other hand, application of the acid as a separate coating from its own water solution is not much better, since enough interaction with the sugar is still possible to produce stickiness from inversion. Thus, the industry has been faced with the problem of how to obtain a nonsticky acidulated sugar coating on various types of confections and medicinal cores.

DESCRIPTION OF THE INVENTION

The present invention relates to a process for adding acidulants for flavoring effects to sugar-containing confectionery products, dragees, medicinal lozenges, cores, and the like.

More particularly, the invention involves a process whereby acidulants may be added to a sugar-coated product without causing inversion of the sugar coat or a resultant product that will become sticky.

In accordance with the method of the present invention, nuts, chewing gum, hard candies, fruits, lozenges, dragees or medicinal tablets, cores and the like are given a candy or sugar coating by conventional procedures, as for example by drum or a rotatable vessel or "pan" coating using war air or other gas to evaporate off the aqueous fraction from the sugar syrup used for coating the feed material. One or more coats of syrup may be applied in this fashion until the desired thickness of coating is reached. One such device for carrying out this step is illustrated in U.S. Pat. No. 3,381,659.

When a sufficient coating has been applied, an edible flavoring acid useful for imparting or enchancing flavor is solubilized in a nontoxic, lower alcohol of two to three carbon atoms, for example, 95 percent ethyl alcohol, absolute alcohol or isopropyl alcohol, selected to have little or no material amount of water present.

The acids contemplated as useful in the present invention for the indicated purpose are those solid edible acids commonly used for their flavoring effects, such as, for example, citric, tartaric, malic, fumaric, succinic, and adipic acids which remain solid at room or atmospheric temperatures and are soluble in the alcoholic solvents mentioned. Each acid should be used at or near the limit of its solubility in the alcoholic solvent, for reasons of economy and convenience. This high concentration is, of course, not an absolute requirement for the practice of the invention.

The alcoholic solution of the desired acid is added to the sugar-coated air- or gas-dried product in substantially the same way as the original syrup coating was applied by methods known in the art. After the material is completely wetted by the addition of sufficient acid solution, warm air or inert gas is then admitted to the vessel for a sufficient time until the product is dry. The application of alcoholic solution of the selected acid may be repeated after each drying step as often as necessary until the desired amount of acid coating has been applied. Suction may be applied to the coating vessel or pan during the acid solution application.

If the acid selected is known to be hygroscopic under normal to high humidity conditions, or if a further coating of sugar, shellac, starch or the like is deemed desirable, such materials may be applied in the usual way to the acid-coated confections or medicinal tablets. Thus, the additional sugar coat or coatings may be carried out by adding the desired sugar syrup in the same way as before. If a shellac coating is desired, this may be applied in alcoholic solution in the same manner as used for adding the acid. On the other hand, if an excipient material such as a light coating of starch is desired, this is merely dusted on over the previously dried and coated product. A wax application and polishing step may, if desired, be carried out on the final product.

The above-described process is applicable to candy-coated chewing gum, soft or hard candies, sugar-coated or glaced fruits, sugar-coated nuts, lozenges, tablets, or other confectionery or coated medicinal centers or cores or unsweetened substances that are intended to be sugar coated. It may be used for introduction of citric, tartaric, fumaric, malic, succinic or adipic acid, or any other edible acid which is sufficiently acidic to cause inversion of sucrose.

The following specific examples will serve to illustrate the procedure in greater detail, but it should be understood that they are not to be taken as limitative of the present invention.

EXAMPLE 1

In a coating pan are placed 10 lbs. of uncoated chewing gum centers. A conventional coating syrup of sugar, corn syrup, and water is applied followed by warm air to dry; this coating and drying is repeated 25 times. A solution of citric acid in 95 percent ethanol, in a weight ratio of 56:100, is applied while air suction is applied to the pan. This coating is dried with warm air and the acid coating is repeated four more times. After the last coat is dry, 25 additional coats of the sugar syrup are applied. A final conventional polishing and wax application completes the coating. This coating shows no signs of becoming tacky or soft on storage.

EXAMPLE 2

Uncoated chewing gum centers are placed in a coating pan and a syrup of sugar, corn syrup, and water is applied followed by warm air drying. Ten coats are applied in this way. Then a solution of malic acid in 95 percent ethanol, weight ratio 36:100, is applied for a total of three coats, suction being applied to the pan during coating and warm air drying after each coat. A further 10 coats of sugar are applied as before. Then three coats of alcoholic malic acid are applied, followed by 10 additional sugar coats, three coats of malic acid, and 10 of sugar. A final finishing with wax and polishing give a product which has good storage stability.

What is claimed is:

1. The process of adding an edible organic acid to a sugar-coated core for oral use comprising adding said acid in alcoholic solution substantially free of water to said sugar-coated core and then removing the alcohol component to leave said acid in dry form on the sugar-coated core.

2. The process of claim 1 in which the alcoholic solution comprises an alcohol selected from the group consisting of 95 percent ethanol, absolute ethyl alcohol and about 99 percent isopropanol.

3. The process of claim 1 in which one or more syrup coatings are applied over the dried acid coating.

4. The process of claim 1 in which the edible acid is one capable of causing the inversion of sucrose.

5. The process of claim 4 in which the edible acid is selected from the group consisting of citric, tartaric, fumaric, malic, succinic, and adipic acids.

6. The process of claim 1 in which said alcohol component is removed by evaporation from a zone in which warm air is admitted to evaporate any liquid present in said zone.

7. The process of claim 6, in which suction is applied to said zone to augment the evaporative action.

8. A sugar-coated, substantially nonhygroscopic edible composition comprising an edible core having at least one sugar layer surrounding said core and at least one solid edible flavoring acid layer in contact with a sugar layer, the product being substantially free of invert sugar.

9. The product of claim 8, in which the solid flavoring agent is selected from the group consisting of citric, malic, fumaric, adipic, succinic and tartaric acid.

10 The product of claim 9, in which the solid flavoring acid layer is sugar coated.

* * * * *

UNITED STATES PATENT OFFICE
CERTIFICATE OF CORRECTION

Patent No. 3,622,352  Dated November 23, 1971

Inventor(s) Frank L. Daylor, Jr.

It is certified that error appears in the above-identified patent and that said Letters Patent are hereby corrected as shown below:

Column 1, line 30, "nonsticky" should be -- non-sticky --;
line 46, "war" should be -- warm --;
line 54, "enchancing" should be - enhancing --;
line 55, "nontoxic" should be -- non-toxic --.

Column 2, line 31, "Example 11" should be -- Example 1 --;
line 48, after "drying." and before "Ten" insert -- Ten coats are applied followed by warm air drying. --;
line 53, after "sugar" and before "are" insert -- syrup --.

Column 3, line 6, "nonhygroscopic" should be -- non-hygroscopic --.

Signed and sealed this 10th day of April 1973.

(SEAL)
Attest:

EDWARD M. FLETCHER, JR.　　　　　　ROBERT GOTTSCHALK
Attesting Officer　　　　　　　　　Commissioner of Patents